United States Patent
Zhang et al.

(10) Patent No.: US 12,425,913 B2
(45) Date of Patent: Sep. 23, 2025

(54) WIRELESS DEVICE, NETWORK NODE AND METHODS FOR EFFICIENT SIDELINK MANAGEMENT

(71) Applicant: Telefonaktiebolaget LM Ericsson (publ), Stockholm (SE)

(72) Inventors: Congchi Zhang, Shanghai (CN); Shehzad Ali Ashraf, Aachen (DE); Zhang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 904 days.

(21) Appl. No.: 17/632,863

(22) PCT Filed: Aug. 6, 2020

(86) PCT No.: PCT/EP2020/072108
§ 371 (c)(1),
(2) Date: Feb. 4, 2022

(87) PCT Pub. No.: WO2021/028304
PCT Pub. Date: Feb. 18, 2021

(65) Prior Publication Data
US 2022/0286892 A1    Sep. 8, 2022

(51) Int. Cl.
*H04W 28/02* (2009.01)
*H04W 92/18* (2009.01)

(52) U.S. Cl.
CPC ... *H04W 28/0215* (2013.01); *H04W 28/0263* (2013.01); *H04W 28/0273* (2013.01); *H04W 92/18* (2013.01)

(58) Field of Classification Search
CPC ......... H04W 28/0215; H04W 28/0263; H04W 28/0273; H04W 92/18; H04W 28/021;
(Continued)

(56) References Cited

U.S. PATENT DOCUMENTS

2016/0277994 A1*  9/2016  John ..................... H04W 76/12
2017/0295563 A1* 10/2017  Ma ........................ H04W 72/04
2019/0239112 A1   8/2019  Rao et al.

FOREIGN PATENT DOCUMENTS

CN    110536262 A    12/2019
WO    2019066558 A1   4/2019

OTHER PUBLICATIONS

Ericsson, "Discussion on SL link mangement", 3GPP TSG-RAN WG2 #107bis, Chongqing, China, Oct. 14, 2019, pp. 1-4, R2-1913321, 3GPP.
(Continued)

*Primary Examiner* — Ashley Shivers
(74) *Attorney, Agent, or Firm* — COATS & BENNETT, PLLC

(57) ABSTRACT

The present invention relates to a method, wireless device and network node for supporting efficient, fast dynamic adaptation of radio links that allow for direct communication between wireless devices. It is desired to reduce signalling overhead and computations. The method at the wireless device comprises receiving configuration-information related to the other wireless device from the other wireless device or a node; determining a link-property of a first radio link of the multiple radio links based on the configuration-information; causing a modification of a second radio link of the multiple radio links based on the determined link-property.

8 Claims, 10 Drawing Sheets

(58) Field of Classification Search
CPC ....... H04W 28/18; H04W 4/40; H04W 40/22; H04W 72/21; H04W 76/23; H04W 76/15; Y02D 30/70
See application file for complete search history.

(56) References Cited

OTHER PUBLICATIONS

Interdigital Inc., "Handling Multiple Unicast Links in NR V2X", 3GPP RAN WG2 Meeting #107, Prague, Czech Republic, Aug. 26, 2019, pp. 1-4, R2-1909589, 3GPP.

3rd Generation Partnership Project, "3rd Generation Partnership Project; Technical Specification Group Services and System Aspects; Architecture enhancements for 5G System (5GS) to support Vehicle-to-Everything (V2X) services (Release 16)", Technical Specification, 3GPP TS 23.287 V1.1.0, Jul. 1, 2019, pp. 1-50, 3GPP.

* cited by examiner

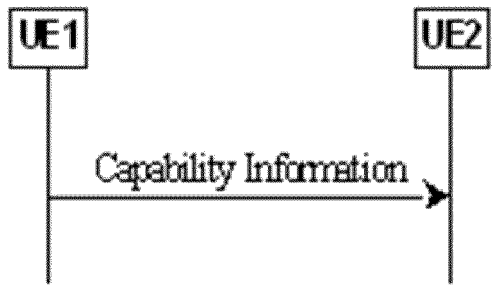
Figure 3.1
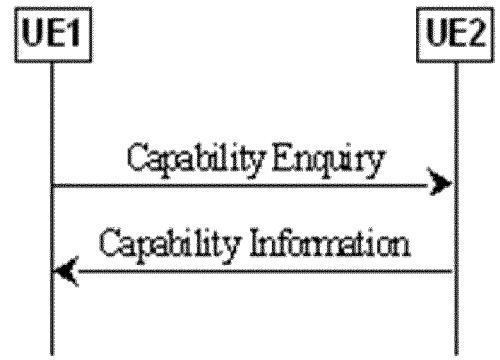
Figure 3.2
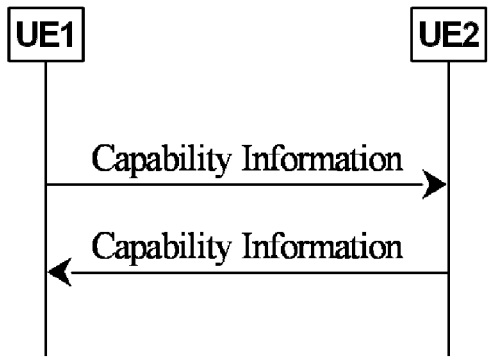
Figure 3.3
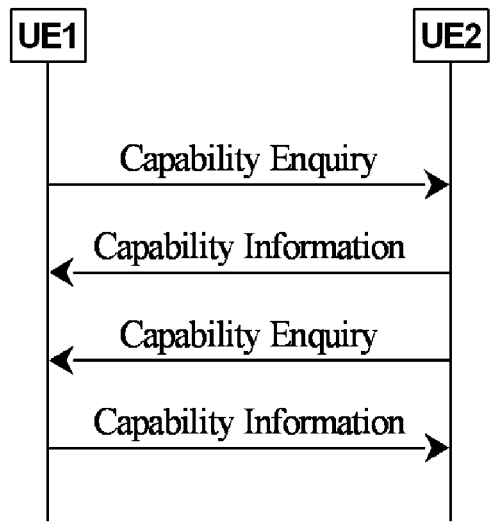
Figure 3.4

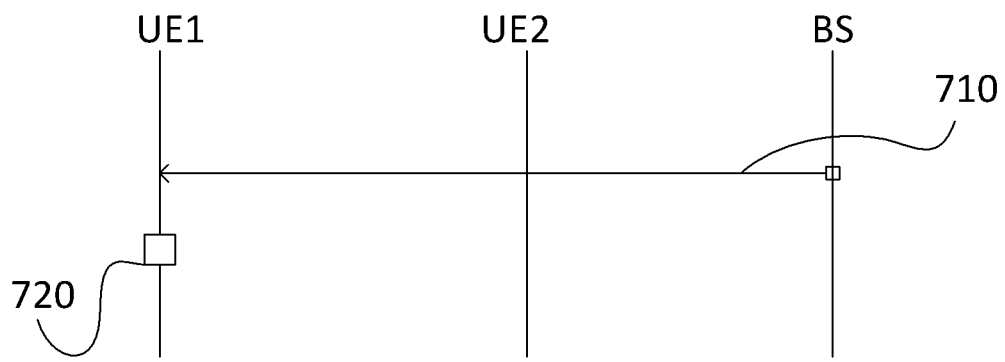
Figure 7.1
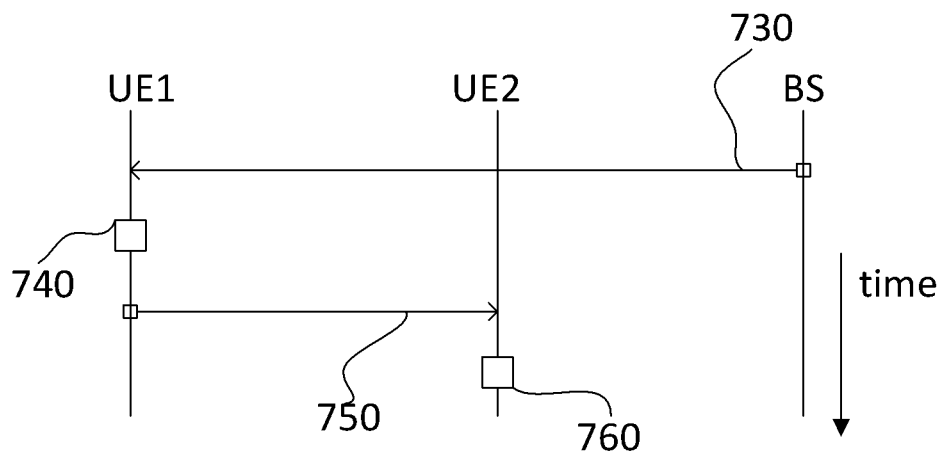
Figure 7.2
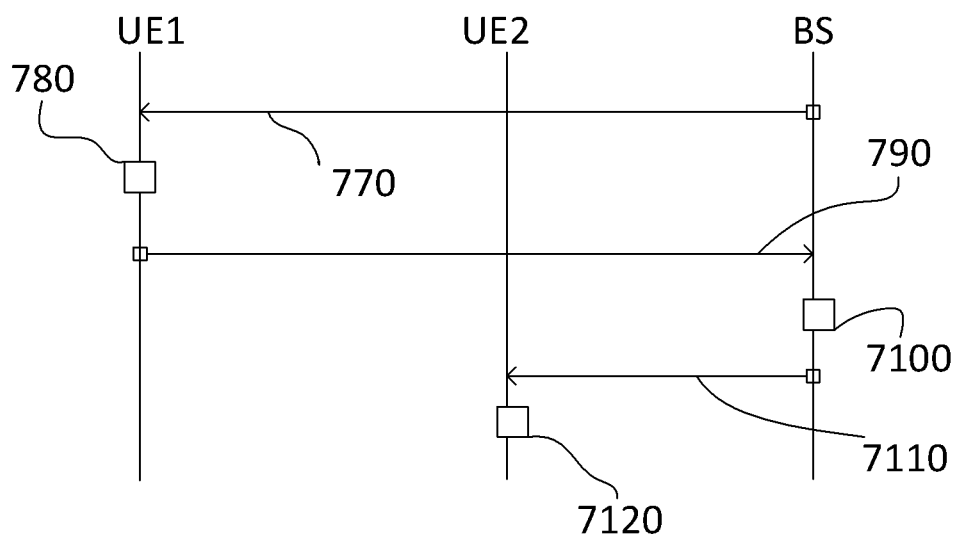
Figure 7.3

WIRELESS DEVICE, NETWORK NODE AND METHODS FOR EFFICIENT SIDELINK MANAGEMENT

TECHNICAL FIELD

The present invention relates to a method and wireless device for supporting link management between two wireless devices in a wireless communication system as well as to a method and network node. The present invention further relates to a system comprising a wireless device and a network node.

BACKGROUND

Cellular Intelligent Transport Systems (C-ITS) aim at defining a cellular eco-system for the delivery of vehicular services and their dissemination. These eco-systems include both short range and long range V2X (Vehicle-to-Everything) service transmissions. FIG. 1 depicts examples of these short range and long-range service transmissions. Short range communication involves transmissions over the D2D (Device-to-Device) link, also defined as sidelink, sidelink interface or PC5 interface in 3GPP, towards other vehicular devices or vehicular user equipments, UEs, or road side units (RSU). Other communication methods providing communication using direct wireless transmissions between wireless devices may be employed as well instead of using sidelinks. On the other hand, for long range transmission, it is intended that the transmissions occur between a UE and a base station over the UMTS air interface (Uu interface). In this case packets can be transmitted and delivered across different intelligent transport system service providers such as road traffic authorities, road operators, automotive OEMs, cellular operators, etc.

Regarding the sidelink (SL) interface, one of the first standardization efforts of this sidelink interface in 3GPP dates to 3GPP-Rel. 12, targeting public safety use cases. Since then, several enhancements have been introduced with the objective to enlarge the use cases that could benefit from the corresponding D2D, or V2X, technologies. For instance, in long term evolution releases 14 and 15, LTE Rel-14 and Rel-15, there are extensions for the device-to-device work support V2X communication, LTE V2X, including any combination of direct communication between vehicles, pedestrians and infrastructure.

While LTE V2X mainly aims at traffic safety services, V2X techniques based on new technological standards, such as 5G, new radio (NR) and other radio communication developments in V2X relate to a much broader scope of possibilities including not only basic safety services but also targeting non-safety applications, such as sensor/data sharing between vehicles with the objective to strengthen the perception of the surrounding environment. Hence a new set of applications, such as vehicle-platooning, cooperative behaviours between vehicles and remote/autonomous driving may be employed within an enhanced sidelink framework.

The expected requirements to meet the corresponding needed data rates, capacity, reliability, latency, communication range and speed can be more stringent. For example, given the variety of services that can be transmitted over the sidelink, for the connections (the sidelink interface) between wireless devices that may be used in V2X techniques, a robust quality of service (QoS) framework is necessary. This framework needs to be based on the different performance requirements of the different V2X services and wireless devices used in V2X related techniques. Additionally, new radio protocols are required to provide more robust and reliable communication. All of this is currently under the investigation of 3GPP in NR Rel. 16.

In the new technological standards employing sidelink connection, i.e. radio links between wireless devices, sometimes just called sidelinks, or corresponding other direct, wireless, inter-device connections, unicast at access stratum (AS) is supported for services requiring high reliability. Between the same pair of wireless devices (a first and a second wireless device), there can be multiple sidelink (SL) unicast links (sidelinks, radio links) and each (radio) link or sidelink can support multiple sidelink quality of service (QoS) flows/radio bearers.

This scenario is depicted in in FIG. 2. FIG. 2 illustrates two wireless devices, UE A and UE B, connected via unicast links (radio links), PC5 unicast link 1 and PC5 unicast link 2. Each unicast link comprises a plurality of PC5 quality of service flow bearers, e.g. PC5 unicast link 1 comprises PC5 QoS Flow #1, PC5 QoS Flow #2, and PC5 QoS Flow #3. As illustrated, the first unicast link, PC5 Unicast link 1, comprises three QoS flows and the second unicast link comprises two QoS flows. Each wireless device runs at least one application layer process (application) per unicast link. Each application layer process (application) has a corresponding application layer ID. Each application layer process may provide corresponding V2X services. For instance, UE A runs an application layer process having application layer ID 1 providing V2X service A and V2X service B for unicast link 1 which comprises the three QoS flow bearers. Service A relates to two QoS flow bearers #1 and #2. Service B relates to one QoS flow bearer #3. This unicast link 1 allows for direct wireless transmissions between UE A and UE B. UE B runs a corresponding application layer process having application layer ID 2 providing V2X service A and V2X service B with respective QoS flow bearers.

At the access stratum layer a (radio) link, sidelink, or QoS flow can be identified by the corresponding source and destination Layer 2 identity (L2 ID). For instance, the PC5 unicast link 1 in FIG. 2 can be identified by the pair of L2 ID1, e.g., corresponding to an application ID1, and L2 ID2, e.g., corresponding to an application ID2.

Some sidelink access stratum level information (AS-level information), such as the wireless devices' (UE) capabilities and access stratum level configuration (AS-level configuration), may need to be exchanged between the wireless devices performing communication using direct wireless transmissions/links, e.g. by applying sidelink unicast. The AS-level information could be exchanged over sidelink using RRC signaling, i.e. PC5-RRC. The PC5-RRC signaling may be sent during or after the sidelink unicast link setup. For RRC connected wireless devices, some sidelink AS-level information, e.g. supported sidelink RAT(s), QoS related information and configurations, etc., may/should be exchanged over communication interfaces such as the UMTS air interface between a wireless device, such as a user equipment, UE, and a node, in particular, a network node such as a base station, called ground NodeB (gNB) in V2X or other network node, e.g. of the core network, used in telecommunication standards that may be presently under development.

Each of the wireless devices may be configured using configuration-techniques that are based on information exchanged between the wireless devices and/or the network nodes, i.e. base stations or nodes of the core network. For instance, there are at least three types of configuration-techniques by which wireless device related information, that may also be referred to as a link-property or link-property information, can be transmitted between/to wireless devices. Based thereon, radio links, such as direct radio transmission links, sidelinks, PC5 unicast links, etc., enabling direct transmissions between the wireless devices may be modified, changed, adjusted.

In other words, a wireless device may use the below configuration-techniques to determine a link-property of a radio link to another terminal, such as a channel busy ratio (link property) of a sidelink (radio link), or to cause a modification of a respective radio link based on the link-property.

In a first example, after having determined the channel busy ratio (which may be an example of a link property) of a PC5 unicast link 1 having application layer ID 1 (configuration-information, L2 ID 1), the wireless device UE A may cause a modification of the unicast link 1 by causing a cancellation or adaption of this unicast link.

A first of such configuration-techniques is capability inquiry. In an example of capability inquiry, a PC5-RRC based wireless device capability transfer can be done in either a one-way or a two-way manner, as shown in FIGS. 3.1, 3.2, 3.3 and 3.4.

FIGS. 3.1 and 3.2 mainly depict what may be referred to as the uni-directional case, where the message indicating the capacity of a wireless device is only transferred in one direction from peer UE, such as another wireless device UE2 to a wireless device which enquired the capability information, UE1. In the one-way case depicted in FIG. 3.1, the wireless device that wants to transfer its capabilities, directly initiates the capability transfer to a peer UE. In the two-way case depicted in FIG. 3.2, the wireless device UE first sends a capability enquiry message to request capability transfer to another wireless device UE2 (the peer UE). Followed by this, the other wireless device UE2 transmits/sends a message indicating its capabilities to the wireless device UE1 based on the received capability inquiry.

In other cases, e.g. when there is bi-directional sidelink (radio link) traffic between two wireless devices, a bi-directional procedure may (also) be needed. In this procedure not only the peer UE2 transfers capability information to the wireless device UE1, but also the wireless device UE1 transfers capability information to the peer UE2 (another wireless device). FIG. 3.3 shows the bi-directional procedure for a corresponding one-way UE capability transfer, and FIG. 3.4 shows the case for a corresponding two-way UE capability transfer.

Another configuration-technique is the radio link monitoring procedure (RLM procedure). In the radio link monitoring procedure, the radio link failure procedure (RLF procedure) employed in telecommunication techniques such as in the new radio (NR) UMTS air interface (Uu) is also supported for new radio side link unicast messages, also called SL unicast.

Once a sidelink (radio link between wireless devices), e.g. a SL unicast link, is established, the transmitting wireless device (TX UE) and/or receiving wireless device (RX UE), can monitor the link quality based on some criteria and claim radio link failure (RLF) if the connection, sidelink or link fails. Possible criteria upon which failure of a connection, such as a sidelink (SL) are determined (detected, computed, deduced) are: expiry of a timer started after indication of radio problems (e.g. a transmission indicating that wireless devices are not synchronized, Out of Sync) from the physical layer, a maximum number of radio link connection (RLC) retransmissions being reached, a maximum number of consecutive HARQ NACK feedbacks being reached, or the channel Busy Ratio (CBR) measured or indicated being higher than (exceeding) a threshold value. The threshold value may be predetermined.

Then a wireless device, e.g. a UE, may release the established sidelinks, unicast link(s), or, in general, direct wireless connections (radio links) with another wireless device due to the given bad link quality or due to stopped services. A corresponding link release procedure is illustrated in FIG. 4. As illustrated in FIG. 4 a first wireless device (UE1) and a second wireless device (UE2), which is a peer UE, communicate with each other via a unicast link. This procedure may be based on PC5-S signaling. E.g., the unicast link may be one of multiple radio links between the wireless devices. More specifically, the unicast link may be one of the two PC5 unicast links 1 and 2 which are sidelinks, described above with reference to FIG. 2. The first wireless device may then transmit a disconnect request to the second wireless device. Thereupon the second wireless device transmits a disconnect response to the first wireless device.

Other configuration-techniques such as link adaptation and close-loop MIMO (e.g. feedback based transmission precoder) can also be performed at the physical layer based on Channel Status Information (CSI) reports from a wireless device, such as a receiving wireless device or a RX UE. In this regard, a transmitting wireless device, TX UE, sends a reference signal (such as a channel state information reference signal, CSI-RS) and upon reception of this signal, the receiving wireless device, RX UE, estimates the quality of the channel between receiving and transmitting wireless device based on the received channel state information reference signal, CSI-RS. In other words, the RX estimates the quality of the channel between the two wireless devices. The receiving wireless device, RX UE, then sends/transmits channel state information reports (CSI-report) to the transmitting wireless device. The CSI report may include one, some, or all the following parameters: rank indicator (RI), precoder matrix indicator (PMI) and channel quality indicator (CQI). Further parameters are possible and commonly known to the person skilled in the art. After receiving a CSI report, the transmitting wireless device can adapt the transmissions according the corresponding channel quality.

Currently, multiple links, such as the above-mentioned radio links or the plurality of unicast links depicted in FIG. 2 and described herein, may exist between two wireless devices, e.g. a pair of wireless devices (UEs). The pair of wireless devices is identified by a pair of different source and destination IDs (L2 IDs), such as the application layer ID of the first wireless device (UE A) and the application layer ID of the other wireless device (UE B) depicted in FIG. 2. The inventors realized that if the radio conditions between this pair of wireless devices is the same for all the radio links (sidelinks), there may be no need to separately monitor each or all of the radio links, for instance by requesting CSI reports, separately. Moreover, there is no need to separately perform corresponding transmission-preparations or adaptations for each radio link between the wireless devices.

However, there is no procedure defined to let one wireless device understand that links are belonging to the pair of wireless devices. Therefore, the configuration-techniques mentioned above, such as RLM/RLF and the CSI report procedure are commonly performed separately for each radio link between two wireless devices (sidelink). This results in unnecessary data-transmissions, e.g. for signaling, and computations resulting in unnecessary computation-overhead, power consumption and decelerated computation-time.

There is thus a need for providing techniques for reducing the corresponding overhead by efficiently managing the radio links between the wireless devices, such as the above-mentioned SL unicast links between UE A and UE B.

SUMMARY

Suitable methods, network node, wireless device, system and computer program are defined in the independent claims. Advantageous embodiments are defined in the dependent claims.

In one embodiment, a method performed by a wireless device communicating with another wireless device via multiple radio links between the wireless devices is provided, wherein each radio link enables direct transmissions between the wireless devices. The method comprises the steps of receiving configuration-information related to the other wireless device from the other wireless device or a node, determining a link-property of a first radio link of the multiple radio links based on the configuration-information and causing a modification of a second radio link of the multiple radio links based on the determined link-property.

In one embodiment, a wireless device communicating wirelessly with another wireless device via multiple radio links is provided, wherein each radio link enables direct transmissions between the wireless devices. The wireless device is adapted to perform the steps of receiving configuration-information related to the other wireless device from the other wireless device or a node, determining a link-property of a first radio link of the multiple radio links based on the configuration-information, causing a modification of a second radio link of the multiple radio links based on the determined link-property.

According to the above embodiments, after having determined the link-property of the first radio link, this measurement result is applied to adapt a second radio link having the same configuration-requirements with the first radio link. Thereby at least a step of determining the link-property of the second radio link can be omitted. Thus, the amount of transmissions/signalling and computation is greatly reduced.

In one embodiment, a method performed by a node is provided. The method comprises the step of receiving identification data from at least a wireless device and another wireless device communicating wirelessly with each other via multiple radio links including a first and a second radio link between them, wherein each radio link enables direct transmissions between the wireless devices. The method further comprises the steps of deducing, based on the received identification data, configuration-information related to the wireless device of the wireless devices, and transmitting the configuration-information to the other wireless device or another node.

In one embodiment, a node of a communication network, i.e. a network node, is provided. The node is adapted to perform the step of receiving identification data from at least a wireless device and another wireless device communicating wirelessly with each other via multiple radio links including a first and a second radio link between them, wherein each radio link enables direct transmissions between the wireless devices. The node is further adapted to perform the steps of deducing, based on the received identification data, configuration-information related to the wireless device of the wireless devices, transmitting the configuration-information to the other wireless device or another node.

According to the above embodiments, a node, here a network node, e.g. radio network node or a core network node, of a wireless communication system can efficiently manage configuration of radio link communication between two wireless devices directly connected via radio links.

In one embodiment, a system comprising a node and wireless device and another wireless device is provided. The node is adapted to perform the steps of receiving identification data from at least the wireless device and the other wireless device communicating wirelessly with each other via multiple radio links including a first and a second radio link between them, each radio link enabling direct transmissions between the wireless devices, deducing, based on the received identification data, configuration-information related to the wireless device of the wireless devices, transmitting the configuration-information to the other wireless device or another node. The other wireless device is adapted to perform the steps of receiving configuration-information related to the other wireless device from the wireless device or the other node, determining a link-property of a first radio link of the multiple radio links based on the configuration-information, causing a modification of a second radio link of the multiple radio links based on the determined link-property.

Accordingly, at least for the reasons detailed above, computations and transmissions are saved thereby reducing power consumption and increasing the management efficiency of radio link (sidelink) transmissions.

Further, advantageous embodiments of the invention are disclosed in the dependent claims.

The present invention thus proposes methods to enable a wireless device (to be) connected via multiple radio links, e.g. sidelinks (SL), to another wireless device to become aware of multiple radio links existing between the wireless device and the other wireless device. Thereby, given the properties (transmission conditions) of one radio link being measured, other radio links sharing a same link-property or being subjected to the same transmission-conditions can be adjusted based on the link-property as a measurement-result of radio conditions.

BRIEF DESCRIPTION OF THE DRAWINGS

FIGS. 3.1, 3.2, 3.3 and 3.4 illustrate examples of a PC5-RRC based UE capability inquiry mechanism applied between two wireless devices.

FIGS. 7.1, 7.2 and 7.3 illustrate embodiments of transmission sequences between wireless devices and network node according to an embodiment.

DETAILED DESCRIPTION OF THE EMBODIMENTS

Further embodiments of the invention are described in the following with reference to the figures. It is noted that the following description contains examples only and should not be construed as limiting the invention.

In the following, similar or same reference signs indicate similar or same elements or operations.

Figure 4:
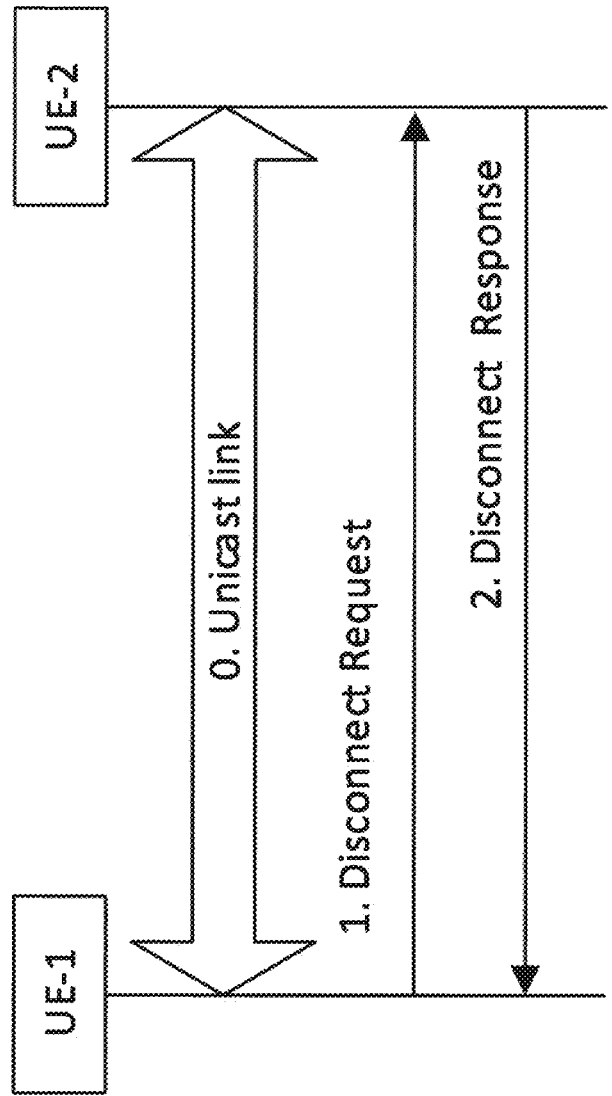
FIG. 4 illustrates a link release procedure supported in new radio RLM/RLF procedures and supported in new radio sidelink unicast.
Figure 5:
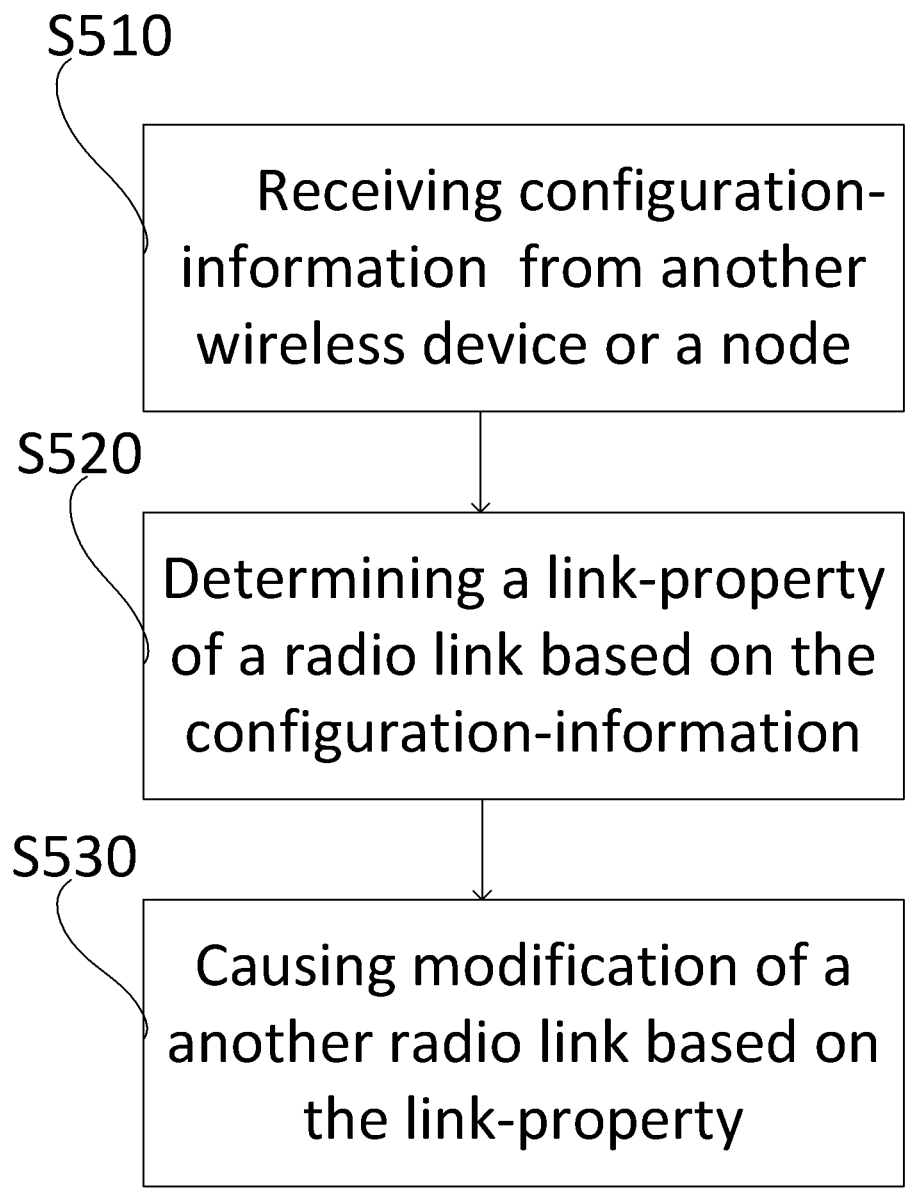
FIG. 5 illustrates a flow diagram of a method performed by wireless device according to an embodiment.

FIG. 5 illustrates a flow diagram corresponding to a method that may be performed by a wireless device according to an embodiment. In a first step, S510, a (first) wireless device UE1 receives configuration information, e.g., a Level 2 identity (L2 ID), from another (a second) wireless device UE2 or a node gNB employed in a wireless communication network. Both wireless devices, the first wireless device and the second wireless device, are used in the telecommunication network (wireless communication network). Moreover, both wireless devices are configured to communicate wirelessly with each other via multiple radio links between the wireless devices. Each radio link enables direct transmissions between both wireless devices, the first wireless device UE1 and the second wireless device UE2, e.g. UE A and UE B in FIG. 2 or UE1 and UE2 in FIGS. 3 and 4.

Direct transmissions may also be referred to as direct communication/signalling between the two wireless devices. In other words, both wireless devices can communicate or transmit data with each other directly without any intermediary network entity, such as a network node, e.g., a gNB. In yet other words, direct transmissions refer to the first wireless device and the second wireless device being able to transmit/receive data transmitted from the respective other wireless device.

Moreover, the radio links may be set up (enabled, generated, activated) prior to reception of the configuration information. However, the radio links may also be set up after receipt of the configuration information. In other words, the radio links may exist when the configuration information is received by wireless device or the radio links may be generated (set up, constructed, started) after the configuration information is received by the wireless device.

Radio links may comprise channels, transmission flows, transmission links, messages, etc. used for direct data transmission between wireless devices.

Configuration-information may comprise identification-information or configuration-indication data, such as an L2 ID. The configuration-information is received from the wireless device and can be transmitted from another wireless device or network node used in the access stratum or non-access stratum layer, such as a base station or an Mobile Mobility Entity (MME) or Access Management Function (AMF). The configuration-information may be transmitted directly from the other wireless device to the wireless device via the radio-link, such as the sidelinks between the wireless device, or over other radio links.

After having received the configuration information, in the second step S520, following the first step, the first wireless device determines a link property of a radio link based on the configuration information.

Figure 1:
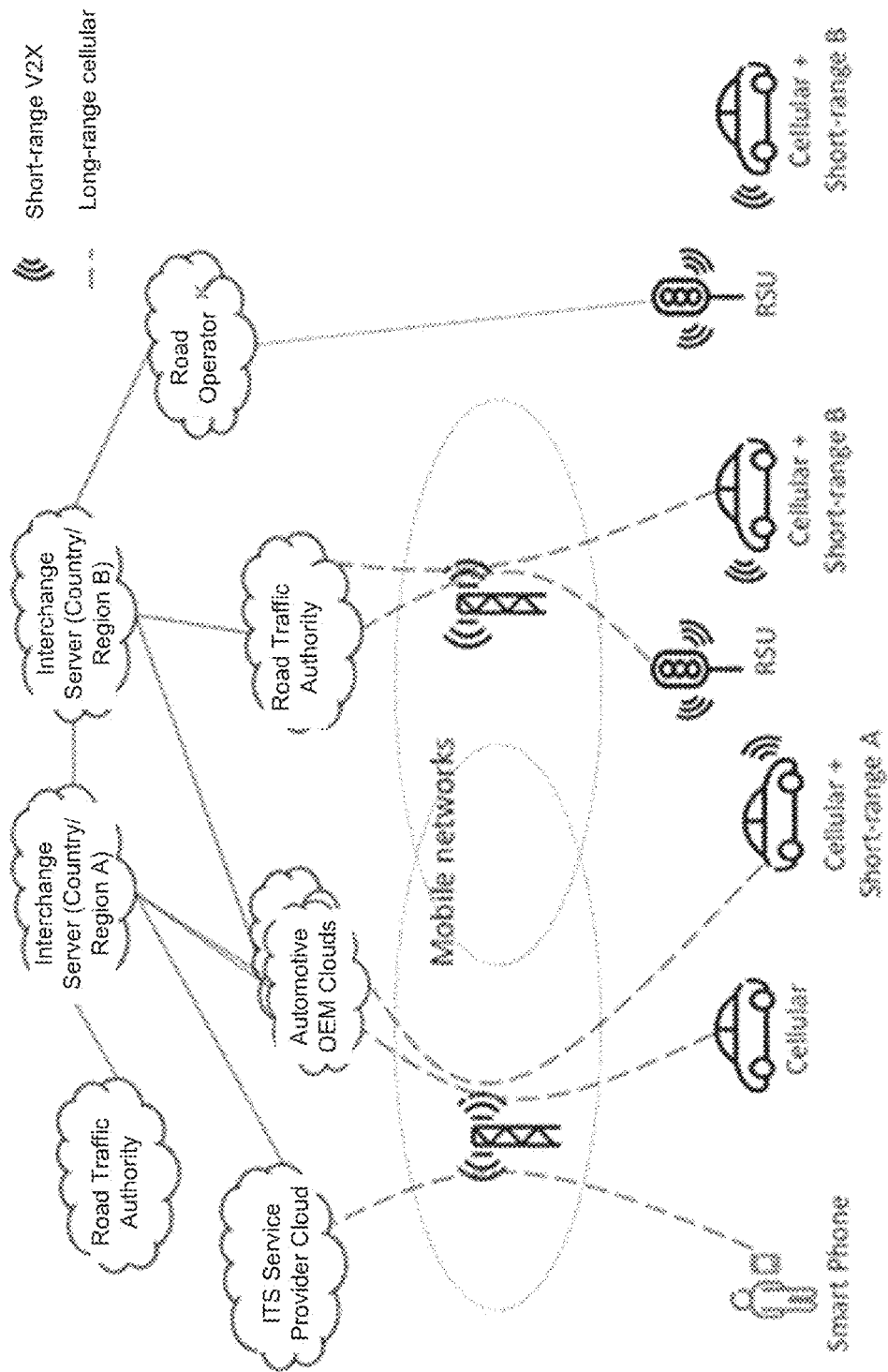
FIG. 1 illustrates an example of a cellular intelligent transport system environment.
Figure 2:
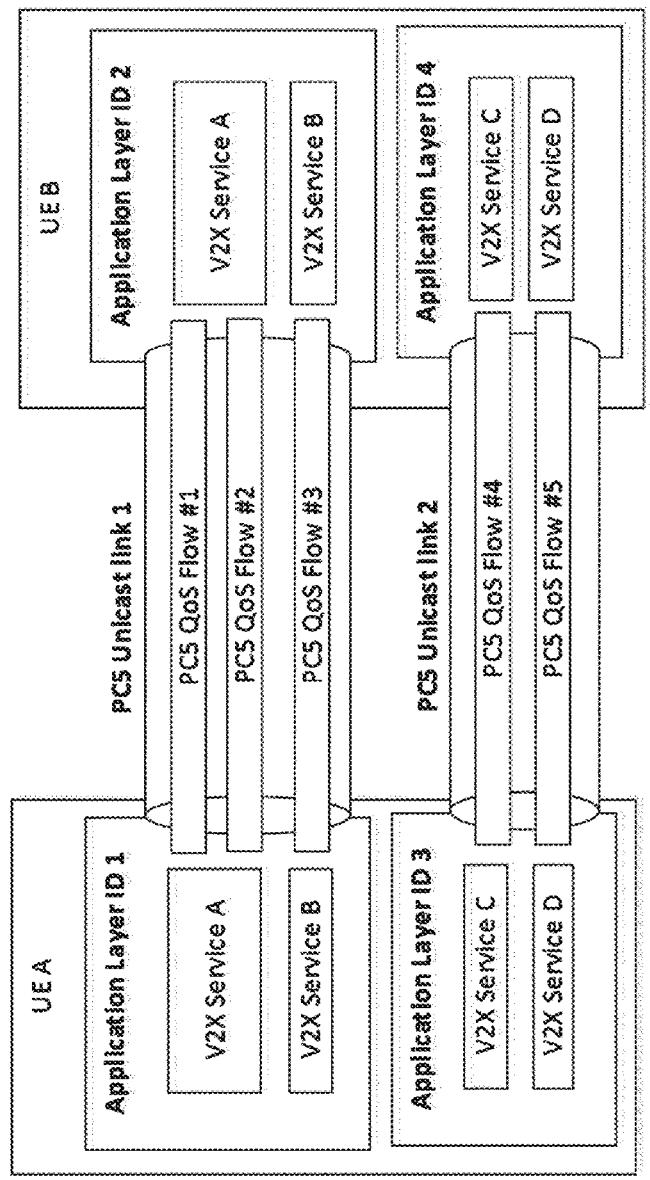
FIG. 2 illustrates a configuration of two wireless devices being connected using multiple new radio sidelink unicast links established between the wireless devices.

For instance, one of the three methods named above, this is, capability inquiry, a radio link monitoring/radio link failure procedure (RLM/RLF procedure) and link adaptation based on channel state information reporting (CSI-reporting), may be used to determine or derive, as link property, corresponding parameters or criteria that may be used as indicators of the transmission quality of at least one of the radio links between the first wireless device UE1 and the second wireless device UE2, such as UE A and UE B of FIG. 2, and/or such as UE1 and UE2 in FIGS. 3 and 4.

After having determined the link property, in the third step, S530, the first wireless device causes modification of another radio link based on the determined link property of the at least one radio link. For instance, when causing the modification of another radio link, the first wireless device may cause an adaptation, change, alteration of the corresponding radio link. This may be done by altering, changing or adapting transmission parameters, this is, parameters used by either the first wireless device, the second wireless device or even the network node used in the communication system.

In an embodiment, the configuration-information indicates at least one of a radio link, an identity of the other wireless device, and a radio-measurement procedure to be used when determining the link-property.

As an example of indicating a radio link, a radio link, such as the PC5 unicast link 2 depicted between UE A and UE B in FIG. 2, may be indicated to UE A as first wireless device by the application layer ID 4. However, the same unicast link may also be indicated to UE B receiving application layer ID 3.

As an example, the identity of the other wireless device may be an access stratum layer identity (L2 AS layer identity), a sidelink radio network temporary identifier (SL-RNTI), or any other type of data known to the skilled person that may be used to identify existing radio links, such as sidelinks, between two wireless devices.

Examples of the configuration-techniques described above are chosen from capability inquiry, monitoring radio link quality, radio link monitoring/radio link failure procedure (RLM/RLF procedure) and link adaptation based on channel state information reporting (CSI-reporting) as described herein. These procedures may be indicated as radio-measurement procedure to be used when determining the link-property described above.

Accordingly, by indicating at least one of the respective radio transmission entities (radio link, identity and radio-measurement procedure), it is possible to efficiently identify the radio links between the wireless devices and perform measurement of radio link quality, or properties of the radio link.

In an embodiment, the configuration-information indicates at least a group of radio links subject to modification, the group of radio links comprising at least two of the multiple radio links between the wireless device and the other wireless device.

As an example, the groups may be determined based on transmission-requirements of the various radio links existing between the wireless devices. For instance, QoS Flow #1 depicted in FIG. 2 may have transmission requirement or configuration properties and/or transmission conditions different from QoS Flows #2 and #3. However, QoS Flows #2 and #3 share some requirements and/or transmission conditions or configuration properties. These requirements allow to apply modifications that are based on link properties of one radio link (e.g. Flow #2) to the other radio link in the group (e.g. Flow #3) without causing deteriorated transmissions in comparison to the case where link properties are determined for each radio link and corresponding modifications are performed based on the respective link properties. Thus, QoS Flows #2 and #3 should be summarized in a group to be changed/modified based on one performed measurement.

For instance, the second wireless device (the other wireless device) UE B transmits application layer ID 2 as configuration-information to the (first) wireless device UE A. Based thereon, UE A may for instance determine the channel busy ratio (CBR) of Qos Flow #2 as link-property of the radio link QoS Flow #2. QoS Flows #2 and #3 are in the same group. In this example, this means that they share the same CBR-requirements and transmission conditions. Thus, if the CBR in Flow #2 exceeds a threshold, Flow #2 may be modified, and Flow #3 may be modified in the same manner based on the CBR-requirements for Flow #2. Thereby, monitoring the CBR of Flow #3 is rendered unnecessary. However, the result, efficient and appropriate adaptation of radio links, is basically the same. Furthermore, different groups are possible, e.g. based on quality of service (QoS) or bandwidth (BW) requirements, each corresponding to different transmission requirements.

Thereby, computations, transmissions, etc. can be saved and adaptation speed is improved. According to an embodiment, determining the link-property of the first radio link comprises obtaining a measurement of a radio condition of the first radio link.

More specifically, the wireless device (first wireless device) having received the configuration-information may perform measurements of a radio condition of the first radio link, such as a sidelink between the wireless device and another wireless device (second wireless device). Alternatively, the first wireless device UE1 may receive a measurement result from the second wireless device UE2. For instance, the first wireless device may have instructed the second wireless device to perform the measurement of radio condition of the radio link between the second and first wireless device before receiving the measurement result. In another instance, a network node transmitted configuration data to the first wireless device. These configuration data configure the first wireless device to receive the measurements from the second wireless device. Moreover, in this instance, the network node transmitted another set of configuration data to the second wireless device. The other set of configuration data configure the second wireless device to perform radio condition measurement of a radio link between the first and second wireless device and transmit the result or indicators based on this result to the first wireless device.

Accordingly, measurement operations of link-properties can be dynamically assigned between wireless devices. Thereby, radio link adjustment is made more flexible allowing for load-optimized performance measurements, for instance, in line with the computational load of each wireless device such that computational load is evenly distributed, distributed according to system-conditions, or focused on the wireless device having faster computational power. Thereby, the operation speed of the wireless device and the whole communication is improved.

In an embodiment, the link-property indicates a link quality or a link state or a capability of the other wireless device.

In an embodiment, the link-property indicated is linked to the results of the radio-measurement procedures indicated by the configuration-information. For instance, if the link-property indicates a link quality, the link-property relates to at least one of an indication of radio problems, a number of RLC transmissions, a number of HARQ NACK feedbacks, and a channel busy ratio. Moreover, if the link-property indicates a link state, the link-property relates to at least one of a rank indicator, a precoder matrix indicator and a channel quality indicator.

Thereby, the corresponding measurement techniques/procedures can be efficiently indicated requiring minimum signalling overhead resulting in efficient, fast dynamic adaptation of radio links.

In another embodiment, the caused modification comprises releasing or adapting a second radio link between the wireless device and the other wireless device.

In an embodiment, the modification comprises at least one of the wireless device UE1 releasing the second radio link, the wireless device UE1 causing the other wireless device UE2 to release the second radio link, the wireless device UE1 adapting the second radio link according to the determined link-property, and the wireless device UE1 causing the other wireless device UE2 to adapt the second radio link according to the determined link-property.

Specifically, when causing the modification of the radio link, the wireless device UE 1 may cause release, cancellation, stop, deletion, discarding or revocation of a corresponding radio link with another wireless device. This may be either done by the wireless device UE 1 itself, or the wireless device may transmit corresponding messages indicating cancellation etc. of the radio link, either directly to the other wireless device UE2 or indirectly to the other wireless device UE2 via a network node. The network node may either directly transmit the received message to the other wireless device UE2 or may process the received message, for instance in a way favourable for reducing signalling overhead and/or reducing computational costs. For instance, the network node may transmit data indicating modification, such as cancellation, etc., in another message scheduled at regular intervals to the other wireless device UE2.

In an embodiment, the at least two radio links comprised in the group of radio links use a same transmission frequency or share the same radio conditions. For instance, the radio conditions may be Quality of Service, QoS, requirements, such as reliability, latency, etc.

In another embodiment, the configuration-information related to the other wireless device is received from the node via higher layer signalling. For instance, the configuration information may be transmitted using RRC signalling using system information blocks (SIBs).

In yet another embodiment, the modification of the second radio link of the multiple radio links comprises changing the transmission power and/or the modulation and coding scheme of the second radio link based on a channel state information report obtained from the first radio link, or changing a multiple-input and multiple-output scheme (MIMO scheme) for the second radio link based on the link-property of the first radio link.

For instance, the first wireless device may modify the second radio link by adapting the modulation and coding scheme (MCS) and/or the transmission power for the second radio link based on a channel state information (CSI) report related to the first radio link.

E.g., the first wireless device may receive a CSI report from the other wireless device indicating at least one of a rank indicator, a precoder matrix and the other examples discussed herein. The CSI report may have been estimated by the other wireless device based on channel state information reference signals (CSI-RS) transmitted by and received from the wireless device receiving the CSI report.

As another example of modifying the second radio link, the wireless device may adapt the commonly known multiple-input and multiple-output scheme (MIMO scheme) applied for transmissions to the other wireless device via the second radio link. The adaption of the MIMO scheme may be based on the capability of the other wireless device indicated in the link-property determined by the wireless device as discussed herein. E.g., the wireless device may use the capability inquiry technique mentioned herein to determine the transmission/reception capabilities of the other wireless device.

Accordingly, signalling overhead is further reduced, reducing power consumption while faster, more flexible dynamic link-adaptation is reached.

Figure 6:
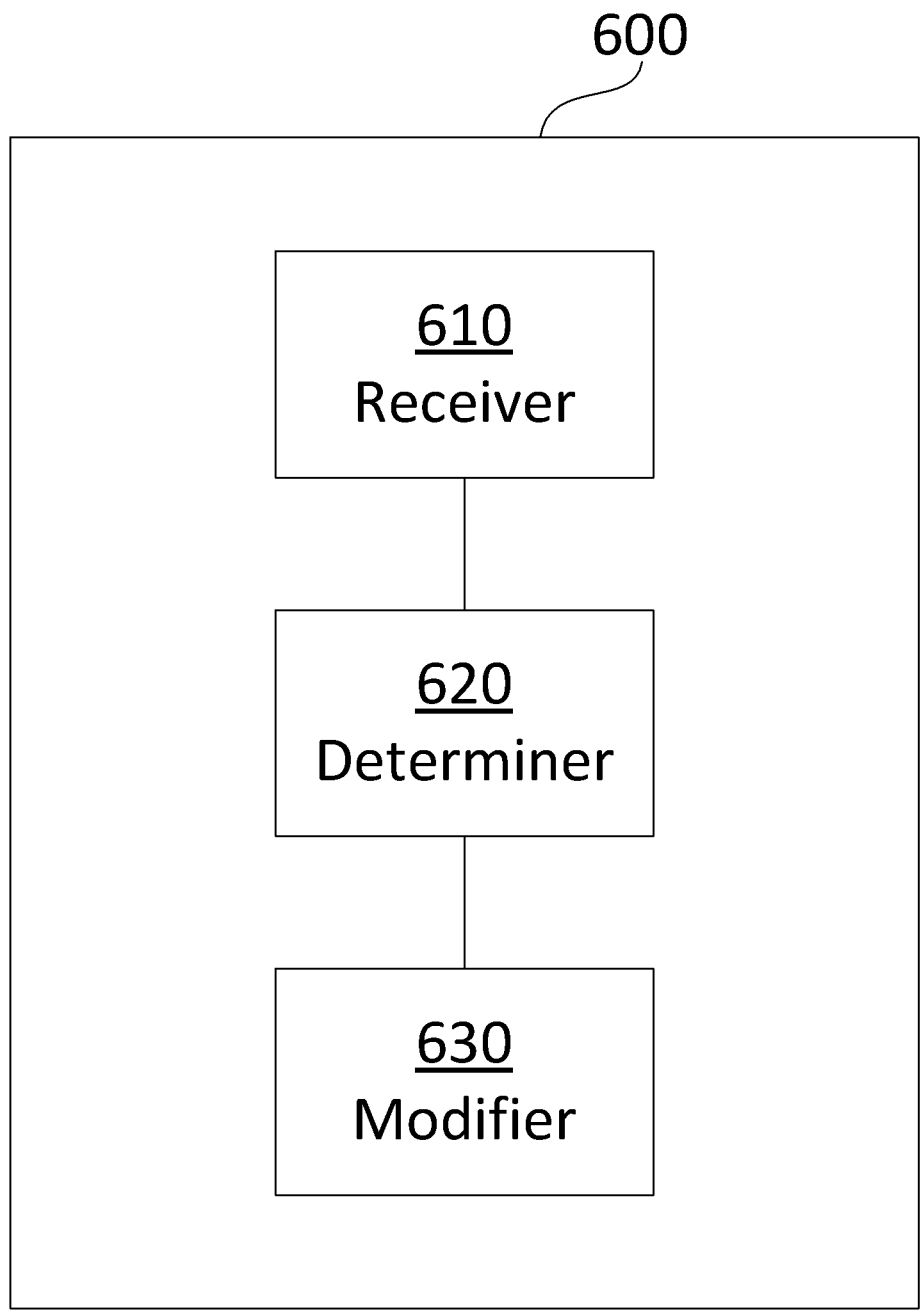
FIG. 6 illustrates a configuration of a wireless device according to an embodiment.

FIG. 6 illustrates the configuration of a wireless device 600, e.g. user equipment or terminal device, configured to perform the functions of the method described above. The wireless device 600 may comprise three subunits, this is, a receiver (or a receiving means) 610, a determiner (or determining means) 620, a modifier (or means for causing modification) 630. Receiver, determiner and modifier may be connected to each other in the manner shown, the receiver 610 may be connected (linked) to the determiner 620. The determiner 620 may be connected to the modifier 630. Furthermore, in an example not shown in the figure, all three of the subunits (receiver, determiner and modifier) may be connected to each other.

The receiver 610 may be configured to receive data and information, such as the configuration information. Specifically, the receiver may be configured to receive configuration information, such as data indicating a layer 2 identification number, the so-called L2 ID, which is related to another wireless device, the second wireless device, employed in the wireless communication network. The corresponding data may be transmitted from the second wireless device, another wireless device employed in the wireless communication network or a node used in the wireless communication network to the first wireless device. Specifically, the configuration information is related to the second wireless device and even more specifically the configuration information is related to radio links (to be) established between the two wireless devices. For instance, the configuration information provides enough information for the first wireless device to identify radio links either already set up or to be established between the first wireless device and the second wireless device.

The determiner (determining means, determination unit) 620 may be configured to determine link property of one of the at least two multiple radio links between the first wireless device and the second wireless device. For example, the determiner may be configured to use some commonly known procedures for determining radiolink quality. More specifically, the determiner 620 may determine a link property of a first radio link of the multiple radio links, which are setup between the first and the second wireless device, using commonly known access stratum layer procedures (AS layer procedures). As a specific example, the determiner 620 may use capability inquiry, radio link monitoring procedures and/or link adaptation procedures that are based on channel state information reporting procedures.

The modifier (causing means, means for causing a modification, control unit) 630 may be configured to cause modification of another radio link based on the link property determined by the determiner 620. For example, the modifier may adapt for release another radio link. Moreover, the modifier may cause modification to be performed either by the wireless device 600 itself, the second wireless device or the network node. For instance, the modifier may cause modification by instructing or controlling the wireless device to transmit the message to the second wireless device or the network node. The message may indicate to the second wireless device or the network node that a second radio link shall be released, adapted or modified based on, this is, taking into account, but link property determined by the determination means 620.

Alternatively, the functionalities of determiner 610 and modifier 620 may be combined in a processor, processing means, or controller that is configured to control the wireless device 600 such that the corresponding steps are performed.

In the examples herein, the wireless device is commonly described as an UE. However, the wireless device may be any type of device or terminal, like a mobile station or other kind of terminal used for wireless communication, e.g. smartphone, tablet computer, laptop, Personal Digital Assistant (PDA) or just their communication functionality, or wearables, etc. Most notably, the wireless device is not limited thereto and may be any wirelessly controllable or intelligent device, including or included in vehicles, such as cars and trucks, modern kitchen appliances, indoor climate control devices, home entertainment equipment, etc., which can be connected to a wireless network, such as V2X or the internet of things.

FIGS. 7.1, 7.2 and 7.3 illustrate further examples of how the first wireless device may cause a modification of the radio links. More specifically, they depict diagrams for describing examples of possible transmission sequences between the wireless devices, e.g. a first wireless device UE1 and second wireless device UE2, and network node, such as a base station BS in the wireless communication network.

In FIG. 7.1, the first wireless device UE1 receives a message in 710 transmitted from the network node, e.g. the base station BS. This message may contain the configuration information related to another wireless device, such as the second wireless device UE2. For instance, configuration information may be any one of the instances or examples described above. Then, after having received the configuration information, the first wireless device UE1 determines in 720 a link property of the first radio link of the plurality of radio links between first and second wireless device taking into account the configuration information. Alternatively, instead of the network node transmitting the message, the second wireless device UE2 may transmit a message indicating or containing configuration information related to it or any of the radio links (to be) established between the second wireless device UE2 and the first wireless device UE1.

FIG. 7.2 illustrates another example of how the first wireless device may cause a modification of a radio link between the first and second wireless device. In this example, the first wireless device receives a message in the signal transmitted in 730 from the network node BS. E.g., the first wireless device may receive a message as described above in FIG. 7.1. In 740 the first wireless device then determines link properties based on the configuration information. After that, the first wireless device transmits the message to the second wireless device. This message may cause the second wireless device to adapt or release the corresponding radio link between the first and second wireless device.

FIG. 7.3 illustrates another example of a modification of another radio link between the wireless devices which may be caused by the first wireless device. In 770, the first wireless device UE1 receives configuration information in a message transmitted from network node BS to the first wireless device UE1. In 780 the first wireless device then determines a link property. In 790, the first wireless device then transmits the message to the network node BS, indicating that, and possibly how, radio links between the wireless devices are to be adapted. In 7100 the network node then determines corresponding parameters and information to be used when adapting the radio links. In 7110, the network node then wirelessly transmits data, such as a message indicating the respective parameters or information to be used when adapting the radio links, to the second wireless device UE2. In 7120, the second wireless device UE2 then adapts the radio links based on the received data transmitted from the network node correspondingly.

Figure 8:
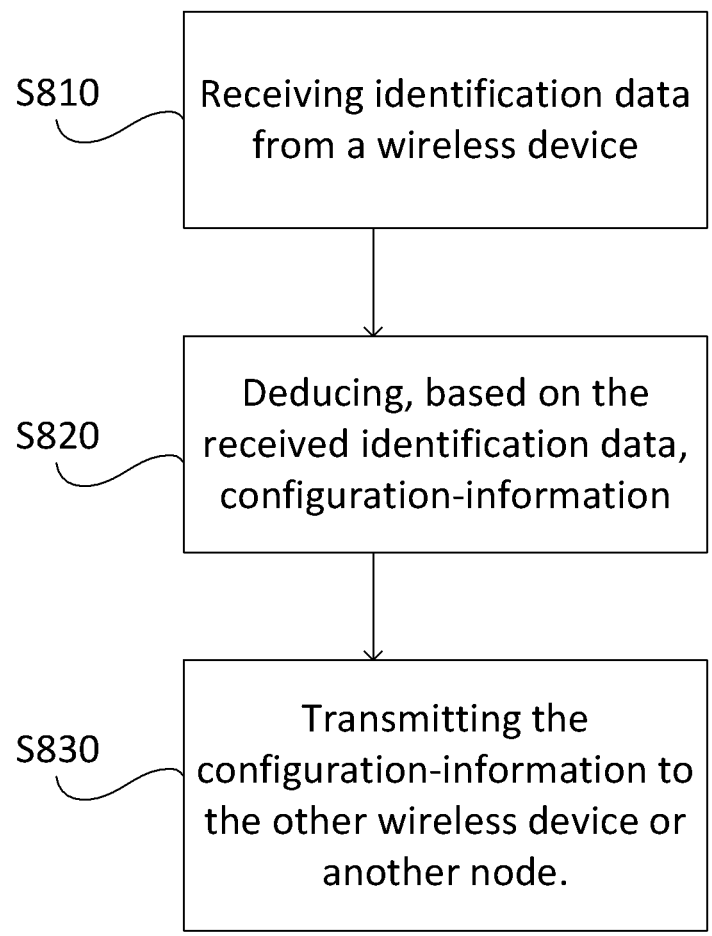
FIG. 8 illustrates a flow diagram of a method performed by a network node according to an embodiment.

FIG. 8 illustrates an example of the steps of a method performed by a network node in the wireless communication system. First, in step S810, the network node receives identification data which is transmitted from a wireless device and the wireless communication system. For instance, the wireless device may be the first wireless device as described above. Furthermore, the network node may be the base station as described above. Moreover, the identification data may be transmitted and received from the first wireless device and/or the second wireless device. The wireless devices communicating wirelessly with each other via multiple radio links including a first and second radio link between them.

After having received the identification data, the network node in step S820 deduces configuration information based on the received identification data. More specifically, the configuration information may relate to the wireless device different from the wireless device which transmitted the identification data. For instance the wireless device transmitting the identification data may be the first wireless device UE1 described above and the wireless device different from the wireless device which transmitted the identification data may be the second wireless device UE2 described above.

Following the determination of the configuration information in step S820, the wireless node transmits the configuration information to the wireless device different from the wireless device which transmitted the identification information in step S830. For instance, the base station may transmit the layer 2 ID of a sidelink (which is a possible specific example of one of the radio links) established between a first UE and a second UE.

Figure 9:
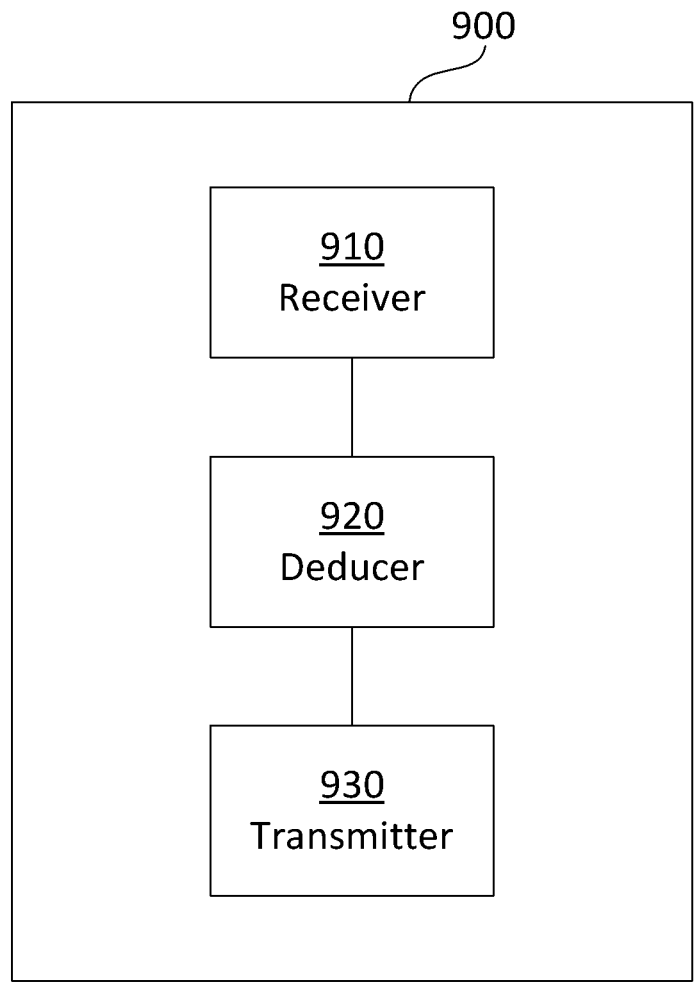
FIG. 9 illustrates a configuration of a network node according to an embodiment.

FIG. 9 illustrates possible configuration of a network node configured to perform the steps of receiving identification data, deducing configuration information and transmitting the configuration information. Specifically, the node 900 comprises at least a receiver 910 a deducer 920 and a transmitter 930.

Receiver 910 may be configured to receive identification data from a first wireless device and the second wireless device communicating wirelessly with each other the wireless devices may communicate with each other by a multiple radio links, e.g. side links. The multiple radio links may comprise a first and second radio link and each of the radio links provides a transmission channel for direct transmissions between corresponding wireless devices.

The deducer (deducing unit) 920 may be configured to deduce configuration information related to the wireless device having transmitted the identification data.

The transmitter (transmission unit) 930 may be configured to transmit the deduce configuration information to another wireless device or another node, e.g. the base station, of the wireless communication network.

Furthermore, the network node may be an MME, AMF or a base station or any other device used to transmit and receive, or convey, data in a telecommunication system, the different layers of a communication system and specifically the access stratum layer and the non access stratum layer, for instance, in the releases of the new radio (NR) standard.

Figure 10:
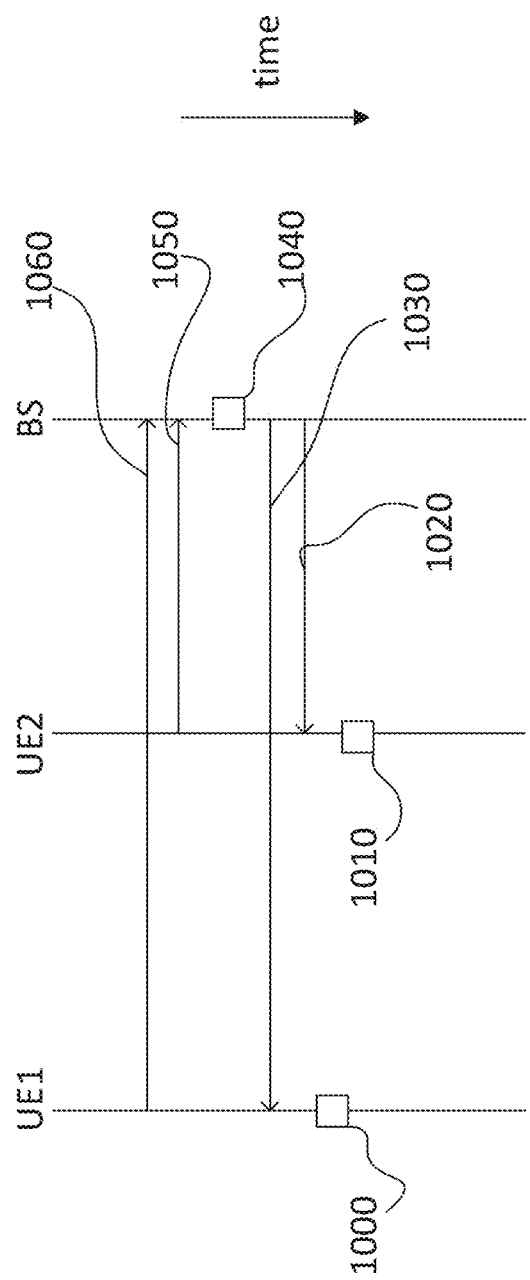
FIG. 10 illustrates transmission sequences between wireless devices and network node according to an embodiment.

FIG. 10 illustrates various examples of from where identification data is transmitted to the network node, how identification data is received by the network node, how identification data is used to deduce configuration information and then transmitted to wireless devices that then may cause modifications of at least one of radio links between them.

In more detail, in 1060 FIG. 10 depicts the network node BS receiving transmissions from a first wireless device and/or in 1050 receiving transmissions from a second wireless device. The transmissions contain respective identification data. In 1040, after having received the transmissions from either the first wireless device and/or the second wireless device, the network node determines, or deduces, configuration information based on the received identification data. The configuration information relates to at least one of the two wireless devices. More specifically, the configuration information relates to the wireless device having transmitted the identification data. Of course, the configuration information may thus also relate to both of the wireless devices, for instance, in case that both wireless devices have transmitted identification data.

After having determined the configuration information, in 1020 and/or 1030 the network node then transmits configuration information to at least one of the wireless devices. In a specific example, the network node transmits the configuration information to the wireless device which did not transmit identification data to the network node. Thereby, the network node enables the wireless device which did not transmit identification data, such as the layer 2 ID, configure or modify radio links existing with another wireless device. More specifically, the wireless device is enabled to identify radio links, e.g. sidelinks, between the wireless device and the wireless device which did transmit identification data. Thus, the wireless device is enabled to cause modifications of the identified radio links. In another example the network node may transmit configuration information to both wireless devices communicating wirelessly using said radio links. Configuration information may provide parameters or in general any kind of data to be used when adjusting or adapting the radio links between the wireless devices.

In 1000 and/or 1010 the one or both of the wireless devices having received the configuration information may perform the steps of determining a link-property and causing a modification of another radio link as detailed above, for instance, when describing FIG. 5.

A specific example of the background of the above embodiments is 5G new radio (NR) sidelink. However, the methods and the procedures are equally valid for any other radio access technology (RAT) supporting multiple radio links between the same UE pairs, such as two wireless devices.

In an example, a network node, such as a base station, called gNB in this 5G new radio example, can deduce links (sidelinks) between the same wireless devices from reported sidelink UE information, such as the source and destination L2 ID, a wireless device's SL-RNTI assigned by the network node (gNB). Then, the network node can provide configuration-information, such as link/SLRB configurations, considering the other existing direct radio links between the two wireless devices. Alternatively, the network node can inform each wireless device about the reported sidelink information, such as the L2 IDs, used by the corresponding other wireless device (peer UE) and cause the wireless device to perform the corresponding configurations, such as releasing one sidelink based on reception quality or another link-property, on its own. In another case, the wireless device may also share a wireless device specific ID over the radiolinks, such as sidelinks, between the wireless devices and the wireless device can then deduce (determine) by itself if multiple wireless device related informations, such as reported L2 IDs, belong to the other wireless device (the peer UE).

In this way, the configuration techniques such as capability inquiry, RLM/RLF procedure, and CSI reporting, or other related procedures can be performed only for one radio link (sidelink, link) or any other wireless direct connection between wireless devices once. Then, procedure/adaptations of the radio links that are based on the measurement results can be applied to remaining, other radio links that exist between the pair of wireless devices, such as, the wireless device (e.g., a first wireless device, first UE) and the other wireless device (e.g., a second wireless device, second UE).

For instance, the wireless device depicted in FIG. 2 as UE A identifies unicast link 1 based on the application layer ID 2 of the other wireless device UE B. The application layer ID 2 may be either received from a network node or the wireless device UE B. Given that unicast link 2 depicted in FIG. 2 shares the same radio conditions, successful adaption of both radio links (unicast links) only requires performing measurement of radio-conditions once, for instance, for unicast link 1. Measurement of radio-conditions may be performed by one of the above-named configuration-techniques, such as CSI-reporting. Then, given the determined link-properties, both radio links, unicast link 1 and unicast link 2 may be adjusted based on the one determined result. Thereby, unnecessary transmissions are reduced or prevented, and the computational effort required to achieve dynamic link adaption is efficiently reduced. The same idea applies to the case where UE A measures the link-properties of one of the PC 5 QoS Flows #1, #2, #3, e.g., PC 5 QoS Flow #1. Given the corresponding link-property, at least one of the remaining two QoS Flows may be adjusted (released, adapted). E.g., given measured properties of QoS Flow #1 (as another example of a first radio link between first and second wireless devices), Qos Flow #2 (as another example of a second radio link in the pair of wireless devices) may be cancelled because of unfavorable channel properties.

The main advantages thus achieved are that duplicated link operations (and procedures) such as the configuration-techniques (RLM/RLF, etc.) that may be performed separately for multiple radio links having the same or a very similar radio connection quality (radio condition) can be avoided.

The methods and the associated signalling procedures allow for efficiently managing multiple radio links, such as unicast links/SLRB, sidelink, in pairs of wireless devices, (UE pairs).

Thereby is provided a simple, advantageous, efficient, power-consumption reducing way to reuse/reapply the measurement-results obtained using configuration techniques and other sidelink access stratum (AS) procedures or configurations for one radio link to another radio link.

In another example, for each sidelink (SL) unicast link, there can be at least a sidelink radio bearer (SLRB). In fact, multiple SL QoS (Quality of Service) Flows/Radio Bearer, may be mapped to a single SL unicast link. In view thereof, the following is applied on the SL unicast link level but could be also applied on the SL QoS Flow/radio bearer level such as the AS layer procedures related to RLM/RLF, UE capability, CSI report as also described above.

Herein described are methods to manage SL unicast links efficiently. For instance, a network node, such as the gNB can deduce links between the same UE pairs from reported sidelink UE information, e.g. source and destination L2 ID, and a UE's own unique SL-RNTI assigned by the network.

Then, gNB can inform one or both of the UE about the presence of multiple unicast links between the same UE pair and configure a UE or the UEs to perform the common access stratum (AS) layer procedures described above, such as RLM/RLF, capability inquiry, CSI acquisition etc. on one or some or all of the unicast links or sidelinks (radio links).

Moreover, a first UE may also share its UE specific ID, which is globally unique and is pre-configured, over a sidelink with another UE SL and the other UE(s) can then deduce by itself if multiple L2 IDs belong to the first UE/peer UE and whether it is necessary to perform the common AS layer procedures (such as the above described configuration-techniques) such as RLM/RLF, capability inquiry, CSI acquisition etc. over one or some or all the unicast links or sidelinks.

In this way, UE capability, RLM/RLF, and CSI report related AS layer procedures can be performed only for one link and applied to other links between the same UE pair.

In a further embodiment, the network node (NW node, NWN) deduces the SL links (radio links) belonging to the same UE pair (first wireless device and second wireless device) from reported UE information, e.g. SidelinkUEInformation, the UE information being transmitted via UL RRC signaling and then transfers this information, e.g. SRC/DST L2 IDs used by the same peer UE (second wireless device UE2), to the wireless device UE1 via DL RRC signaling.

In another embodiment, the NW node, network node, deduces the SL links (radio links) belonging to the same UE pair by comparing the source L2 ID reported from one UE and destination L2 ID reported from another UE. For instance, the NW node stores the mapping between UE unique ID assigned by the network, e.g. SL-RNTI, and UE report, e.g. SidelinkUEInformation. When the source L2 ID reported by one UE, e.g. with SL-RNTI=1, is same as the destination L2 ID reported by another UE, e.g. with SL-RNTI=2, and vice versa, one SL unicast link is identified between the two UEs.

In another embodiment, the NW node could inform both two UEs that the SL links existed between them, the SL link could be indicated by e.g. the combination of source and destination L2 ID. The NW node could optionally also indicate which source and destination L2 ID are used for SL AS layer operation, e.g. RLM/RLF and CSI report, between the two UEs. The NW node could also inform this only to one of the two UEs, and the UE being informed forwards the information to the peer UE. The UEs may also determine by themselves which source and destination L2 ID are used for SL AS layer operation if this is not provided by the NW.

In one embodiment, the node indicates the UE to perform the common AS layer procedures or configuration after deducing that the links belong to the same UE. Examples of procedures and configuration-operations are RLM/RLF, capability inquiry, CSI acquisition etc. over one or some or all the unicast links. Especially, if two unicast links (radio links, sidelinks) have completely different QoS requirements, the criteria used for RLF declaration or whether CSI acquisition is enabled or CSI report parameter-configuration can be different. For instance, there may be two groups of sidelinks (unicast links) having different QoS requirements. Correspondingly, the corresponding common AS layer procedures may be configured differently for each group.

In another embodiment, the network sends an indication via RRC signalling that common AS layer procedures or configuration can be applied for all the links. The indication can be in a form of a flag (e.g., enabled/disabled) or can explicitly indicate on which L2 ID the common AS layer procedures or configuration needs to be applied.

In another embodiment, the network sends a new indication via RRC to the UE (or both of them) by instructing the same AS layer procedure or configuration for multiple (and not all) SL unicast links.

In one embodiment, the network sends an indication via SIB (for UEs in RRC_CONNECTED and RRC_IDLE/RRC_INACTIVE) that common AS layer procedures or configuration can be applied for all the links.

In another embodiment, the network sends an indication via dedicated-SIB (for UEs in RRC_CONNECTED) that common AS layer procedures or configuration can be applied for all the links.

In another embodiment, the switching between some or all links and per-unicast link procedure or configuration is done via RRC messages (i.e., RRCReconfiguration message).

In another embodiment, the switching between some or all links and per-unicast link procedure is done via MAC CE.

In yet another embodiment, the switching between some or all links and per-unicast link procedure is done via DCI (L1 procedure).

In another embodiment, the network identifying whether multiple SL links are between the same UE pair can be either cell/RAN node such as gNB or the upper node, e.g. MME or AMF. When it is the upper node, e.g. MME or AMF, the upper node informs the identification results to the respective serving cell(s)/RAN node(s) of the UEs, optionally the informing could be performed only when it is identified that these exists multiple links between the same UE pair and the UEs are served by different cells/RAN nodes. The informing could optionally also indicate which source and destination L2 ID are used for SL AS layer operation, e.g. RLM/RLF and CSI report etc., between the UE pair. Accordingly, the cell/RAN node will send the information to the relevant UE.

In another embodiment, the SL unicast link identification could be performed by the UE(s) themselves, with information exchanged over sidelink. More specifically, UE announces/exchanges its unique UE ID, e.g. C-RNTI plus serving cell ID, I-RNTI, GUI, etc. over sidelink. This can be done by including the unique UE ID in discovery message, and/or in (one) SL control message to the peer UE during or after SL unicast link establishment. With this information, each UE can know whether multiple source/destination L2 IDs of other UEs are associated with the same UE ID, inherently the UE also knows whether multiple source/destination L2 IDs are associated with itself, consequently each UE can identify which SL links are between which UE pair, at least for the (unicast) SL links that the UE is involved in.

In one embodiment, AS layer procedures and configuration such as RLM, CSI acquisition etc, performed on one link are also applicable for other links between a pair of UEs (wireless devices). However, in some cases, it is not allowed to use this information from one link for another link. For example, if QoS requirements of two links are very different, radio link failure (RLF) on one link does not mean RLF for another link. The criteria to determine this behavior is based on QoS requirements and (pre-)configuration. However, radio links may be grouped according to their QoS or frequency, as discussed with respect to the above groups above. Similarly, CSI report configurations for different links can be different.

According to the above, methods enabling the SL UEs to be aware that there are multiple links existing between the same UE pair are proposed. Advantages of the disclosed methods are, for example, that duplicated link operations (and procedures) for multiple links between the same UE pair can be avoided. This will reduce the signalling overhead and battery consumption of UE.

As is understood by the skilled person, the wireless device 600 and network node 900 may include a bus, a processing unit, a main memory, a ROM, a storage device, an I/O interface consisting of an input device and an output device, and a communication interface, such as a transceiver. The bus may include a path that permits communication among the components. Processing unit may include a processor, a microprocessor, or processing logic that may interpret and execute instructions and may form the main part of a controller, such as controllers. Main memory may include a RAM or another type of dynamic storage device that may store information and software instructions for execution by processing unit.

The wireless device and network node may perform certain operations or processes described herein, in particular in FIGS. 5 and 8. They may perform these operations in response to processing unit executing software instructions contained in a computer-readable medium. A computer-readable medium may be defined as a physical or a logical memory device. For example, a logical memory device may include memory space within a single physical memory device or distributed across multiple physical memory devices.

The software instructions contained in a main memory may cause the processing unit including a processor, when executed on the processor, to cause the processor to perform operations or processes described herein. Alternatively, hardwired circuitry may be used in place of or in combination with software instructions to implement processes and/or operations described herein. Thus, implementations described herein are not limited to any specific combination of hardware and software.

The physical entities according to the different embodiments of the invention, including the devices, nodes and systems, may comprise or store computer programs including software instructions such that, when the computer programs are executed on the physical entities, steps and operations according to the embodiments of the invention are carried out, i.e. cause processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term controller or control unit is used, no restriction is made regarding how distributed this element may be and regarding how gathered these elements may be. That is, the constituent elements may be distributed in different software and hardware components or other elements for bringing about the intended function. A plurality of distinct elements may also be gathered for providing the intended functionalities.

Further, the functions of the network node 900 may be distributed over several network nodes. For example, network node 900 may receive and transmit messages from/to the wireless device 600 and forward the information received to another network node acting as deducer.

Further, the elements of the devices or nodes or system may be implemented in hardware, software, Field Programmable Gate Arrays (FPGAs), Application Specific Integrated Circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practising the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

| Abbreviation | Explanation |
| --- | --- |
| NW | Network |
| UE | User Equipment |
| V2X | Vehicle-to-Everything |
| MAC | Medium Access Control |
| MAC CE | MAC Control Element |
| PUSCH | Physical Uplink Shared Channel |
| PUCCH | Physical Uplink Control Channel |
| PDU | Packet Data Unit |
| 3GPP | Third Generation Partnership Project |
| LCID | Logical Channel Identity |
| MAC | Medium Access Control |
| MAC CE | Medium Access Control - Control Element |
| RRC | Radio Resource Control |
| IP | Internet Protocol |
| PPPP | ProSe Per Packet Priority |
| PPPR | ProSe Per Packet Reliability |
| ProSe | Proximity Services |
| PRB | Physical Resource Block |
| SL | Sidelink |
| UL | Uplink |
| DL | Downlink |
| LCG | Logical Channel Group |
| AMF | Access Management Function |
| SMF | Session Management Function |
| DRB | Data Radio Bearer |
| PDU | Protocol data unit |
| QoS | Quality of service |
| LCP | Logical Channel Prioritization |
| SDU | Service Data Unit |
| TB | Transport Block |
| AS | Access stratum |
| SCI | Sidelink Control Information |
| HARQ | Hybrid Automatic Repeat Request |

The invention claimed is:

1. A method performed by a node, the method comprising:
   receiving identification data from at least a wireless device and another wireless device communicating wirelessly with each other via multiple radio links including a first and a second radio link between them, each radio link enabling direct transmissions between the wireless devices;
   deducing, based on the received identification data, configuration-information related to the wireless device of the wireless devices;
   transmitting the configuration-information to the other wireless device or another node.

2. The method of claim 1, wherein the configuration-information allows the other wireless device to determine a link-property of the first radio link of the multiple radio links based on the configuration-information.

3. The method of claim 1, wherein the configuration-information indicates the first radio link of the multiple radio links, an identity of the wireless device, and/or a radio-measurement procedure to be used when determining a link-property.

4. The method of claim 1, wherein the configuration-information indicates a group of radio links to be subjected to modification caused by the other wireless device, the group of radio links comprising at least two of the multiple radio links between the wireless device and the other wireless device.

5. The method of claim 1, wherein the configuration-information allows the other wireless device to cause a modification of the second radio link of the multiple radio links.

6. The method of claim 1, further comprising receiving a measurement of a radio condition of the first radio link from the other wireless device and forwarding the measurement of the radio condition to the wireless device.

7. The method of claim 1, wherein the configuration-information related to the wireless device is transmitted to the other wireless device via higher layer signaling.

8. A node comprising:
   processing circuitry; and
   memory comprising instructions executable by the processing circuitry whereby the node is configured to:
      receive identification data from at least a wireless device and another wireless device communicating wirelessly with each other via multiple radio links including a first and a second radio link between them, each radio link enabling direct transmissions between the wireless devices;
      deduce, based on the received identification data, configuration-information related to the wireless device of the wireless devices;
      transmit the configuration-information to the other wireless device or another node.

* * * * *